United States Patent
Gerrits et al.

(10) Patent No.: US 12,466,160 B2
(45) Date of Patent: Nov. 11, 2025

(54) BI-DIRECTIONALLY ORIENTED MULTILAYER FILM

(71) Applicant: SABIC GLOBAL TECHNOLOGIES B.V., Bergen op Zoom (NL)

(72) Inventors: Niclasina Siberta Johanna Alberdina Gerrits, Geleen (NL); Attilio Scala, Geleen (NL); Priya Garg, Geleen (NL); Jacobus Christinus Josephus Franciscus Tacx, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 624 days.

(21) Appl. No.: 17/423,292

(22) PCT Filed: Jan. 13, 2020

(86) PCT No.: PCT/EP2020/050683
§ 371 (c)(1),
(2) Date: Jul. 15, 2021

(87) PCT Pub. No.: WO2020/151978
PCT Pub. Date: Jul. 30, 2020

(65) Prior Publication Data
US 2022/0080703 A1 Mar. 17, 2022

(30) Foreign Application Priority Data
Jan. 23, 2019 (EP) .................. 19153191

(51) Int. Cl.
| B32B 7/027 | (2019.01) |
| B29C 48/00 | (2019.01) |
| B29C 48/21 | (2019.01) |
| B29C 55/14 | (2006.01) |
| B32B 27/08 | (2006.01) |
| B32B 27/32 | (2006.01) |

(52) U.S. Cl.
CPC .......... *B32B 7/027* (2019.01); *B29C 48/0018* (2019.02); *B29C 48/21* (2019.02); *B29C 55/143* (2013.01); *B32B 27/08* (2013.01); *B32B 27/327* (2013.01); *B29K 2023/06* (2013.01); *B32B 2250/242* (2013.01); *B32B 2307/31* (2013.01); *B32B 2307/518* (2013.01); *B32B 2307/72* (2013.01); *B32B 2307/732* (2013.01); *B32B 2439/70* (2013.01)

(58) Field of Classification Search
None
See application file for complete search history.

(56) References Cited

U.S. PATENT DOCUMENTS

| 6,162,871 A | 12/2000 | Watanabe et al. |
| 6,270,819 B1 * | 8/2001 | Wiese ............ B32B 27/08 426/115 |
| 6,492,010 B1 | 12/2002 | Karaoglu et al. |
| 11,352,456 B2 | 6/2022 | Gerrits et al. |
| 2004/0131806 A1 | 7/2004 | Barmore et al. |
| 2007/0117946 A1 | 5/2007 | Schwab et al. |
| 2017/0008984 A1 * | 1/2017 | Ding ............ C08F 210/02 |
| 2017/0297312 A1 | 10/2017 | Oyama |
| 2018/0201705 A1 | 7/2018 | Desportes et al. |
| 2018/0272672 A1 | 9/2018 | Ambroise |
| 2021/0253759 A1 | 8/2021 | Gerrits et al. |
| 2022/0001588 A1 | 1/2022 | Fan et al. |
| 2022/0064389 A1 | 3/2022 | Garg et al. |

FOREIGN PATENT DOCUMENTS

| EP | 3753732 A1 | 12/2020 |
| JP | 3672394 B2 * | 7/2005 |
| JP | 2006508872 A | 3/2006 |

(Continued)

OTHER PUBLICATIONS

Exxon Mobil Exceed(TM) 0015XC product datasheet (Year: 2020).*
International Search Report; International Application No. PCT/EP2020/050683; International Filing Date: Jan. 13, 2020; Date of Mailing: Feb. 20, 2020; 11 pages.
Written Opinion; International Application No. PCT/EP2020/050683; International Filing Date: Jan. 13, 2020; Date of Mailing: Feb. 20, 2020; 11 pages.
International Search Report for International Application No. PCT/EP2020/050681; International Filing Date: Jan. 13, 2020; Date of Mailing: Apr. 28, 2020; 4 pages.

(Continued)

*Primary Examiner* — Frank J Vineis
*Assistant Examiner* — Nicole T Gugliotta
(74) *Attorney, Agent, or Firm* — CANTOR COLBURN LLP

(57) ABSTRACT

The present invention relates to a multilayer film comprising: • an inner layer system comprising a first surface and a second surface; • a first skin layer bound to the inner layer system at the first surface of the inner layer system; and • a second skin layer bound to the inner layer system at the second surface of the inner layer system; wherein • the inner layer system comprises a first ethylene-based polymer; and • at least one of the first or the second skin layer(s) is a sealing layer and comprises a second ethylene-based polymer having a peak melting temperature $T_{pm}$ of at least 10° C. below the $T_{pm}$ of the first ethylene-based polymer, $T_{pm}$ being determined as peak melting temperature in accordance with ASTM D3418 (2008); wherein the multilayer film is a bi-directionally oriented film wherein the orientation is introduced in the solid state. Such film allows for the production of a sealed package having a sufficiently high sealing strength at reduced sealing temperatures, also referred to as the seal initiation temperature.

19 Claims, No Drawings

(56) References Cited

FOREIGN PATENT DOCUMENTS

| | | |
|---|---|---|
| JP | 2017177699 A | 10/2017 |
| JP | 2017177727 A | 10/2017 |
| WO | 9837140 A1 | 8/1998 |
| WO | 0056547 A | 9/2000 |
| WO | 03059599 A1 | 7/2003 |
| WO | 2004060672 A1 | 7/2004 |
| WO | 2011004001 A1 | 1/2011 |
| WO | 2015157939 A1 | 10/2015 |
| WO | 2017007640 A1 | 1/2017 |
| WO | 2018096480 A1 | 5/2018 |
| WO | 2018113455 A1 | 6/2018 |
| WO | 2019207172 A1 | 10/2019 |
| WO | 2020064349 A1 | 4/2020 |

OTHER PUBLICATIONS

Written Opinion for International Application No. PCT/EP2020/050681; International Filing Date: Jan. 13, 2020; Date of Mailing: Apr. 28, 2020; 8 pages.

International Search Report for International Application No. PCT/EP2019/067327, International Filing Date Jun. 28, 2019, Date of Mailing Sep. 11, 2019, 5 pages.

International Search Report for International Application No. PCT/EP2019/078184, International Filing Date Oct. 17, 2019, Date of Mailing Nov. 5, 2019, 6 pages.

International Search Report for International Application PCT/EP2020/065891, International Filing Date Jun. 9, 2020, Date of Mailing Sep. 17, 2020, 4 pages.

Written Opinion for International Application No. PCT/EP2019/067327, International Filing Date Jun. 28, 2019, Date of Mailing Sep. 11, 2019, 5 pages.

Written Opinion for International Application No. PCT/EP2019/078184, International Filing Date Oct. 17, 2019, Date of Mailing Nov. 5, 2019, 7 pages.

Written Opinion for International Application PCT/EP2020/065891, International Filing Date Jun. 9, 2020, Date of Mailing Sep. 17, 2020, 5 pages.

* cited by examiner

BI-DIRECTIONALLY ORIENTED MULTILAYER FILM

CROSS REFERENCE TO RELATED APPLICATIONS

This application is a National Stage application of PCT/EP2020/050683, filed Jan. 13, 2020, which claims the benefit of European Application No. 19153191.2, filed Jan. 23, 2019, both of which are incorporated by reference in their entirety herein.

The present invention relates to a bi-directionally oriented multilayer film comprising an ethylene-based polymer. The invention also relates to a process for the production of such film. The invention further relates to the use of such film in packaging applications such as food packaging applications. In particular, the inventions relates to films that require certain heat sealability properties.

Films comprising ethylene-based polymers, materials are abundantly used in a wide variety of applications. A particular example where such films find their application is in food packaging. Use of such films allows for packaging of foodstuff products in a very hygienic manner, contributes to preservation of the packaged products for a prolonged period, and can be done in a very economically attractive way. Further, such films can be produced with a highly attractive appearance. Examples of ethylene-based polymers include polyethylene materials or PE.

A particular type of films that may be produced from ethylene-based polymers are biaxally oriented films wherein the orientation is introduced in the solid state, also referred to commonly as bi-directionally oriented films or BO films. BO films are widely used in for example food packaging applications. Such BO films may for example be produced by sequential or simultaneous stretching of a film produced by cast extrusion in both the longitudinal direction, also referred to as machine direction, and the transverse direction of the film. By so, a film can be produced with high modulus and strength, thus enabling down-gauging of the film, which is one of the main drivers in the packaging industry, as is contributes to reduction of weight of the package, and material consumption. In addition, such films are processable reliably at very high processing speeds in packaging lines.

An exemplary description of the production of BO films can for example be found in WO03/059599-A1, describing a method of production of BO films using a so-called tenter frame, wherein the film, subsequent to production via cast extrusion, is subjected to stretching in the machine direction via operation of various rolls that exert a stretching force onto the cast film as a result of the selected speed of the cooperating rolls, and wherein subsequently the film is subjected to an orientation force in the transverse direction.

In many applications of BO films, it is required that the package, after being provided with the contents to be stored in it, is hermetically sealed, in such way that penetration of gases or moisture from the environment into the package is minimised or even eliminated. Commonly, this is achieved by heat sealing of the package. In such process, the remaining opening(s) of the package are subjected to thermal energy, either by direct contact heating or by irradiation, so that the side of the film that constitutes the inner side, thus towards the packaged goods, reaches a temperature at which it becomes sufficiently soft so that, upon applying a contacting pressure and reducing the temperature, a thermoplastic seal is formed that seals the packed contents from the environment.

There is a demand to ensure that the temperature at which the sealing layer of the film becomes sufficiently soft to allow for production of a seal having sufficient strength is reduced.

This has now been achieved according to the present invention by a multilayer film comprising:
- an inner layer system comprising a first surface and a second surface;
- a first skin layer bound to the inner layer system at the first surface of the inner layer system; and
- a second skin layer bound to the inner layer system at the second surface of the inner layer system;

wherein
the inner layer system comprises a first ethylene-based polymer; and
at least one of the first or the second skin layer(s) is a sealing layer and comprises a second ethylene-based polymer having a peak melting temperature $T_{pm}$ of at least 10° C. below the $T_{pm}$ of the first ethylene-based polymer, $T_{pm}$ being determined as peak melting temperature in accordance with ASTM D3418 (2008);

wherein the multilayer film is a bi-directionally oriented film.

Such film allows for the production of a sealed package having a sufficiently high sealing strength at reduced sealing temperatures, also referred to as the seal initiation temperature.

The first ethylene-based polymer may for example be a polymer comprising moieties derived from ethylene and an α-olefin comprising 4-10 carbon atoms. For example, the α-olefin comprising 4-10 carbon atoms may be selected from 1-butene, 1-hexene, 4-methyl-1-pentene, and 1-octene, such as from 1-butene, 1-hexene and 1-octene. For example, the α-olefin comprising 4-10 carbon atoms may be selected from 1-hexene and 1-octene. The moieties derived from an α-olefin comprising 4-10 carbon atoms may for example be moieties derived from 1-butene, 1-hexene, 4-methyl-1-pentene, 1-octene, or combinations thereof, preferably from 1-hexene or 1-octene.

Preferably, the first ethylene-based polymer is a copolymer comprising moieties derived from ethylene and moieties derived from one or more α-olefins selected from propylene, 1-butene, 4-methyl-1-pentene, 1-hexene, and 1-octene, preferably selected from 1-hexene and 1-octene.

It is further preferred that the first ethylene-based polymer comprises ≤30.0 wt % of moieties derived from an α-olefin comprising 4-10 carbon atoms, with regard to the total weight of the polyethylene, preferably ≤20.0 wt %, more preferably ≤15.0 wt %. The first ethylene-based polymer may for example comprise ≤1.0 wt % of moieties derived from an α-olefin comprising 4-10 carbon atoms, with regard to the total weight of the first ethylene-based polymer, preferably ≥2.0 wt %, more preferably ≥5.0 wt %. For example, the first ethylene-based polymer may comprise ≥1.0 and ≤30.0 wt % of moieties derived from an α-olefin comprising 4-10 carbon atoms, with regard to the total weight of the first ethylene-based polymer, preferably ≥2.0 wt % and ≤20.0 wt %, more preferably ≥5.0 and ≤15.0 wt %.

The α-olefin comprising 4-10 carbon atoms may for example be selected from 1-butene, 1-hexene, 4-methyl-1-pentene, and 1-octene, such as from 1-butene, 1-hexene and 1-octene. For example, the α-olefin may be 1-hexene. For example, the α-olefin comprising 4-10 carbon atoms may be selected from 1-hexene and 1-octene. The moieties derived from an α-olefin comprising 4-10 carbon atoms may for example be moieties derived from 1-butene, 1-hexene, 4-methyl-1-pentene, 1-octene, or combinations thereof, preferably from 1-hexene or 1-octene. For example, the moieties derived from an α-olefin comprising 4-10 carbon atoms may be 1-hexene.

It is preferred that the first ethylene-based polymer comprises ≥70.0 wt % of moieties derived from ethylene, with regard to the total weight of the first ethylene-based polymer, preferably ≥80.0 wt %, more preferably ≥85.0 wt %. Preferably, the first ethylene-based polymer comprises ≥70.0 and ≤99.0 wt %, more preferably ≥80.0 and ≤98.0 wt %, even more preferably ≥85.0 and ≤95.0 wt % of moieties derived from ethylene, with regard to the total weight of the first ethylene-based polymer.

The first ethylene-based polymer may for example have a density of ≥910 and ≤930 kg/m³ as determined in accordance with ASTM D792 (2008). Preferably, the first ethylene-based polymer may have a density of ≥910 and ≤925 kg/m³. More preferably, the first ethylene-based polymer has a density of ≥915 and ≤925 kg/m³. Even more preferably, the first ethylene-based polymer has a density of ≥916 and ≤925 kg/m³, or even more preferably ≥916 and ≤922 kg/m³.

The first ethylene-based polymer may for example have a melt mass-flow rate as determined in accordance with ASTM D1238 (2013) at 190° C. under a load of 2.16 kg, also referred to as MFR2, of ≥0.2 and ≤5.0 g/10 min, preferably ≥0.5 and ≤5.0 g/10 min, referably ≥0.5 and ≤3.0 g/10 min, more preferably ≥0.8 and ≤3.0 g/10 min, even more preferably ≥1.0 and ≤3.0 g/10 min, even more preferably ≥1.0 and ≤2.5 g/10 min.

The first ethylene-based polymer is characterised by its particular a-TREF fingerprint, that is, it has a particular distribution of the fractions of polymer that in a-TREF are eluted in particular defined temperature ranges in which the fractionation is performed. In particular, the first ethylene-based polymer may for example have a fraction eluted in a-TREF at a temperature >94.0° C. of ≥20.0 wt %, with regard to the total weight of the polymer. More preferably, the polymer has a fraction eluted >94.0° C. of ≥25.0 wt %, even more preferably ≥30.0 wt %, yet even more preferably ≥35.0 wt %.

The first ethylene-based polymer may for example have a fraction that is eluted in analytical temperature rising elution fractionation (a-TREF) at a temperature ≤30.0° C. of ≥8.0 wt %, with regard to the total weight of the polymer. The fraction that is eluted at a temperature of ≤30° C. may in the context of the present invention be calculated by subtracting the sum of the fraction eluted >94° C. and the fraction eluted >30° C. and ≤94° C. from 100%, thus the total of the fraction eluted ≤30° C., the fraction eluted >30° C. and ≤94° C. and the fraction eluted >94° C. to add up to 100.0 wt %. The fraction eluted ≤30° C. preferably is ≥9.0 wt %, more preferably ≥10.0 wt %, even more preferably ≥11.0 wt %.

Preferably, the fraction of the first ethylene-based polymer that is eluted in a-TREF at a temperature ≤30.0° C. is ≥8.0 and ≤16.0 wt %, more preferably ≥9.0 and ≤14.0 wt %, even more preferably ≥10.0 and ≤14.0 wt % with regard to the total weight of the polymer; and/or preferably, the fraction that is eluted in a-TREF at a temperature >94.0° C. is ≥20.0 and ≤50.0 wt %, more preferably ≥25.0 and ≤45.0 wt %, even more preferably ≥30.0 and ≤40.0 wt %, with regard to the total weight of the polymer; and/or preferably, the fraction that is eluted in a-TREF at a temperature >30.0 and ≤94.0° C. is ≥40.0 and ≤64.0 wt %, more preferably ≥45.0 and ≤60.0 wt %, even more preferably is ≥45.0 and ≤55.0 wt %.

The first ethylene-based polymer in a preferred embodiment comprises at least 70.0 wt % of moieties derived from ethylene, with regard to the total weight of the first ethylene-based polymer, wherein the first ethylene-based polymer has:
- a density of ≥910 and ≤930 kg/m³ as determined in accordance with ASTM D792 (2008);
- a melt mass-flow rate of ≥0.5 and ≤5.0 g/10 min, as determined in accordance with ASTM D1238 (2013) at a temperature of 190° C. under a load of 2.16 kg;
- a fraction that is eluted in analytical temperature rising elution fractionation (a-TREF) at a temperature ≤30.0° C. of ≥8.0 wt %, with regard to the total weight of the polymer; and/or
- a fraction eluted in a-TREF at a temperature >94.0° C. of ≥20.0 wt %, with regard to the total weight of the first ethylene-based polymer.

In a particular embodiment of the invention, the second ethylene-based polymer has:
- a fraction of material that is eluted in analytical temperature rising elution fractionation (a-TREF) at a temperature >94.0° C. of ≤5.0 wt %, preferably ≤1.0 wt %, with regard to the total weight of the second ethylene-based polymer;
- a shear storage modulus G' determined at a shear loss modulus G"=5000 Pa of >700 Pa, G' and G" being determined in accordance with ISO 6721-10 (2015) at 190° C.; and/or
- a chemical composition distribution broadness (CCDB) of ≥5.0, preferably ≥10.0, preferably ≥15.0, preferably ≥20.0.

For example, the second ethylene-based polymer may have a peak melting temperature $T_{p,m}$ of ≤110° C., preferably ≤105° C., more preferably ≤100° C.

In the context of the present invention, the CCDB is determined according to formula I:

$$CCDB = \frac{T_{z+2} - T_{n-2}}{T_{n-2}} * 100 \qquad \text{formula I}$$

wherein
$T_{n-2}$ is the moment calculated according to the formula II:

$$T_{n-2} = \frac{\sum \frac{w(i)}{T(i)^2}}{\sum \frac{w(i)}{T(i)^3}} \qquad \text{formula II}$$

and
$T_{z+2}$ is the moment calculated according to the formula III:

$$T_{z+2} = \frac{\sum w(i) \cdot T(i)^4}{\sum w(i) \cdot T(i)^3} \qquad \text{formula III}$$

wherein
w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and
T(i) is the temperature at which sample (i) is taken in a-TREF analysis, in ° C.

The second ethylene-based polymer preferably has a fraction of material that is eluted in a-TREF at a temperature of ≤30.0° C. of ≥5.0 wt % with regard to the total weight of the polyethylene, preferably ≥7.5 wt %, more preferably ≥10.0 wt %, even more preferably ≥11.5 wt %. Preferably, the second ethylene-based polymer has a fraction of material that is eluted in a-TREF at a temperature of ≤30.0° C. of ≥5.0 wt % and ≤25.0 wt %, more preferably ≥7.5 wt % and ≤20.0 wt %, even more preferably ≥10.0 wt % and ≤20.0 wt %, even more preferably ≥11.0 wt % and ≤15.0 wt %, with regard to the total weight of the ethylene-based polymer. The use of an ethylene-based polymer having such a fraction of material that is eluted in a-TREF at a temperature of ≤30.0° C. in the sealing layer(s) of the film according to the invention contributes to a reduction of the seal initiation temperature.

The second ethylene-based polymer preferably has a shear storage modulus G' determined at a shear loss modulus G"=5000 Pa of >700 Pa, preferably >800 Pa, more preferably >900 Pa, even more preferably >1000 Pa. The second ethylene-based polymer preferably has a shear storage modulus G' determined at a shear loss modulus G"=5000 Pa of <1500 Pa, preferably <1300 Pa, more preferably <1200 Pa, even more preferably <1100 Pa. The second ethylene-based polymer preferably has a shear storage modulus G' determined at a shear loss modulus G"=5000 Pa of >700 and <1500 Pa, preferably >700 and <1300 Pa, more preferably >800 and <1200 Pa, even more preferably >800 and <1100 Pa. The use of an ethylene-based polymer having such shear storage modulus G' at a shear loss modulus of 5000 Pa in the sealing layer(s) of the film according to the invention contributes to a reduction of the seal initiation temperature and facilitates biaxial drawability of the BO film.

According to the invention, analytical temperature rising elution fractionation, also referred to as a-TREF, may be carried out using a Polymer Char Crystaf-TREF 300 equipped with stainless steel columns having a length of 15 cm and an internal diameter of 7.8 mm, with a solution containing 4 mg/ml of sample prepared in 1,2-dichlorobenzene stabilised with 1 g/l Topanol CA (1,1,3-tri(3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution may be performed with a heating rate of 1° C./min from 30° C. to 140° C. The set-up may be cleaned at 150° C. The sample injection volume may be 300 μl, and the pump flow rate during elution 0.5 ml/min. The volume between the column and the detector may be 313 μl. The fraction that is eluted at a temperature of ≤30.0° C. may in the context of the present invention be calculated by subtracting the sum of the fraction eluted >30.0° C. from 100%, thus the total of the fraction eluted ≤30.0° C., and the fraction eluted >30.0° C. to add up to 100.0 wt %.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

For determination of the shear storage modulus G' and the shear loss modulus G", specimens may be used as prepared in accordance with ISO 17855-2 (2016). The DMS measurements were carried out according to ISO 6721-10 (2015) at 190° C. Determination of G' at G"=5000 Pa may be done by preparation of a double-logarithmic Cole-Cole plot of G' and G", where above and below G"=5000 Pa, each 2 data points are to be selected, so in total 4 data points, and a first order line may be determined, where from this line G' at G"=5000 Pa is determined.

The second ethylene-based polymer preferably has a CCDB of ≥5.0, preferably ≥10.0, preferably ≥15.0, preferably ≥17.5, more preferably ≥20.0. For example, the second ethylene-based polymer may have a CCDB of ≥5.0 and ≤30.0, preferably ≥15.0 and ≤30.0, preferably ≥15.0 and ≤25.0, more preferably ≥15.0 and ≤22.5. The use of an ethylene-based polymer having such CCDB in the sealing layer(s) of the film according to the invention contributes to an improved seal strength.

It is preferred that the second ethylene-based polymer comprises ≥60.0 wt % of moieties derived from ethylene, with regard to the total weight of the second ethylene-based polymer, preferably ≥70.0 wt %, more preferably ≥80.0 wt %. Preferably, the second ethylene-based polymer comprises ≥60.0 and ≤98.0 wt %, more preferably ≥70.0 and ≤95.0 wt %, even more preferably ≥80.0 and ≤90.0 wt % of moieties derived from ethylene, with regard to the total weight of the second ethylene-based polymer.

It is further preferred that the second ethylene-based polymer comprises ≤40.0 wt % of moieties derived from an α-olefin comprising 4-10 carbon atoms, with regard to the total weight of the second ethylene-based polymer, preferably ≤30.0 wt %, more preferably ≤20.0 wt %. The second ethylene-based polymer may for example comprise ≥5.0 wt % of moieties derived from an α-olefin comprising 4-10 carbon atoms, with regard to the total weight of the second ethylene-based polymer, preferably ≥10.0 wt %, more preferably ≥15.0 wt %. For example, the second ethylene-based polymer may comprise ≥5.0 and ≤40.0 wt % of moieties derived from an α-olefin comprising 4-10 carbon atoms, with regard to the total weight of the second ethylene-based polymer, preferably ≥10.0 wt % and ≤30.0 wt %, more preferably ≥15.0 and ≤20.0 wt %.

The α-olefin comprising 4-10 carbon atoms may for example be selected from 1-butene, 1-hexene, 4-methyl-1-pentene, and 1-octene, such as from 1-butene, 1-hexene and 1-octene. For example, the α-olefin comprising 4-10 carbon atoms may be selected from 1-hexene and 1-octene. The moieties derived from an α-olefin comprising 4-10 carbon atoms may for example be moieties derived from 1-butene, 1-hexene, 4-methyl-1-pentene, 1-octene, or combinations thereof, preferably from 1-hexene or 1-octene.

The second ethylene-based polymer may for example comprise ≤40.0 wt % of moieties derived from an α-olefin comprising 4-10 carbon atoms, with regard to the total weight of the second ethylene-based polymer, preferably ≤30.0 wt %, more preferably ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene. The second ethylene-based polymer may for example comprise ≥5.0 wt % of moieties derived from an α-olefin comprising 4-10 carbon atoms, with regard to the total weight of the second ethylene-based polymer, preferably ≥10.0 wt %, more preferably ≥15.0 wt %, wherein the α-olefin comprising 4-10 carbon atoms is selected from 1-butene, 1-hexene, 4-methyl-1-pentene, and 1-octene, such as from 1-butene, 1-hexene and 1-octene. For example, the second ethylene-based polymer may comprise ≥5.0 and ≤40.0 wt % of moieties derived from an α-olefin comprising 4-10 carbon atoms, with regard to the total weight of the second ethylene-based polymer, preferably ≥10.0 wt % and ≤30.0 wt %, more preferably ≥15.0 and ≤20.0 wt %, wherein the α-olefin comprising 4-10 carbon atoms is selected from 1-butene, 1-hexene, 4-methyl-1-pentene, and 1-octene, such as from 1-butene, 1-hexene and 1-octene.

The comonomer content and the comonomer type may be determined by $^{13}C$ NMR, such as on a Bruker Avance 500 spectrometer equipped with a cryogenically cooled probe head operating at 125° C., whereby the samples are dissolved at 130° C. in $C_2D_2Cl_4$ containing DBPC as stabiliser.

The second ethylene-based polymer may for example have a density of ≥850 and ≤914 kg/m$^3$ as determined in accordance with ASTM D792 (2008). Preferably, the first ethylene-based polymer may have a density of ≥865 and ≤905 kg/m$^3$. More preferably, the first ethylene-based polymer has a density of ≥865 and ≤890 kg/m$^3$.

The sealing layer(s) of the film according to the present invention may for example comprise >20.0 wt %, or >30.0 wt %, or >40.0 wt %, or >50.0 wt %, or >60.0 wt %, or >70.0 wt %, or >80.0 wt %, or >90.0 wt %, of the second ethylene-based polymer, with regard to the total weight of the layer. Alternatively, the sealing layer(s) may consist of or essentially consist of the second ethylene-based polymer.

In the context of the present invention, an embodiment wherein the a layer of the film essentially consist of a polymer is to be understood as wherein that layer of the film consists of the polymer and optionally additives known in the art of polyethylene films, such as up to 5.0 wt % of additives, with regard to the total weight of the layer. Suitable additives may for example include anti-block agents, slip agents, UV stabilisers, antioxidants, and processing aids.

The sealing layer(s) of the film according to the present invention may for example comprise <99.0 wt %, or <95.0 wt %, or <90.0 wt %, or <80.0 wt %, or <70.0 wt %, or <60.0 wt %, of the second ethylene-based polymer, with regard to the total weight of the layer. The sealing layer(s) of the film may comprise for example >20.0 and <99.0 wt % of the second ethylene-based polymer, or >20.0 wt % and <90.0 wt %, or >20.0 wt % and <75.0 wt %.

The second ethylene-based polymer may for example be produced via a solution polymerisation process, preferably by polymerisation of ethylene with 1-hexene and/or 1-octene. The second ethylene-based polymer may for example be produced using a metallocene-type catalyst, preferably by polymerisation of ethylene with 1-hexene and/or 1-octene.

The inner layer system may for example consist of a single layer. Alternatively, the inner layer system may consist of multiple layers, preferably multiple layers each having the same composition, more preferably multiple layers each consisting essentially of the first ethylene-based polymer. The inner layer system may for example consist of 3, 5, 7, or 9 layers.

For example, the inner layer system may comprise at least one layer comprising ≥95.0 wt % of the first ethylene-based polymer, preferably at least one layer consisting of the first polymer and <5.0 wt % of additives, with regard to the total weight of the inner layer system.

For example, the inner layer system may comprise ≥95.0 wt % of the first ethylene-based polymer, preferably consists of the first ethylene-based polymer and <5.0 wt % of additives, with regard to the total weight of the inner layer system.

The inner layer system may for example have a thickness of ≥60.0 wt %, preferably ≥65.0 wt %, more preferably ≥70.0 wt %, even more preferably ≥75.0 wt %, with regard to the total weight of the multilayer film.

In the multilayer film according to the present invention, the additives may for example be selected from UV stabilisers, antistatic agents, slip/anti-block agents, fillers, antioxidants, pigments, processing aids such as fluoroelastomers, and mixtures thereof. For example, the multi-layer film may comprise <20.0 wt %, preferably >0.0 and <20.0 wt %, preferably >0.0 and <10.0 wt %, more preferably >0.5 and <5.0 wt %, even more preferably >0.5 and <2.5 wt %, of additives, with regard to the total weight of the multilayer film. For example, the multilayer film may comprise additives selected from erucamide, oleamide, silica, talc, and mixtures thereof. For example, the multilayer film may comprise >0.0 and <5.0 wt %, more preferably >0.5 and <2.5 wt %, even more preferably >0.5 and <1.5 wt % of additives selected from erucamide, oleamide, silica, talc, and mixtures thereof. For example, the multilayer film may comprise >0.0 and <20.0 wt %, preferably >5.0 and <20.0 wt %, even more preferably >5.0 and <15.0 wt %, of titanium oxide.

In a certain embodiment, the film may have a wetting tension as determined in accordance with ASTM D2578 (2009) of ≥35 mN/m.

In the multilayer film according to the present invention, at least one of the first or the second skin layer(s) is a sealing layer and comprises a second ethylene-based polymer having a peak melting temperature $T_{pm}$ of at least 10° C. below the $T_{pm}$ of the first ethylene-based polymer, $T_{pm}$ being determined as peak melting temperature in accordance with ASTM D3418 (2008). The second ethylene-based polymer may have a $T_{pm}$ of at least 10° C. below the $T_{pm}$ of the first ethylene-based polymer. Preferably, the $T_{pm}$ of the second ethylene-based polymer is at least 14° C. below the $T_{pm}$ of the first ethylene-based polymer, more preferably at least 15° C., more preferably at least 20° C., even more preferably at least 30° C.

For example, each of the first and the second skin layer may be a sealing layer and comprise the second ethylene-based polymer. Alternatively, the first skin layer may be a sealing layer comprising the second ethylene-based polymer and the second skin layer may comprise the first ethylene-based polymer.

It is preferred that the first skin layer comprises the second ethylene-based polymer and that the second skin layer comprises the first ethylene-based polymer. For example, the multilayer film according to the present invention may comprise a first skin layer comprising the second ethylene-based polymer and a second skin layer consisting or essentially consisting of the first ethylene-based polymer.

It is preferred that each of the skin layer(s) has a thickness of ≤3.0 μm, preferably ≤2.5 μm, more preferably ≤2.0 μm. Each of the skin layer(s) may for example have a thickness of 0.5-3.0 μm, preferably 0.5-2.5 μm, more preferably 1.0-2.0 μm.

It is preferred the each of the skin layer(s) has a thickness of ≤20.0%, preferably ≤15.0%, more preferably ≤10.0%, with regard to the total thickness of the multilayer film. Each of the skin layer(s) may for example have a thickness of ≥5.0 and ≤20.0%, preferably ≥5.0 and ≤15.0%, more preferably ≥10.0 and ≤15.0%, with regard to the total thickness of the multilayer film.

It is preferred that each of the sealing layer(s) has a thickness of ≤3.0 µm, preferably ≤2.5 µm, more preferably ≤2.0 µm. Each of the sealing layer(s) may for example have a thickness of 0.5-3.0 µm, preferably 0.5-2.5 µm, more preferably 1.0-2.0 µm.

It is preferred the each of the sealing layer(s) has a thickness of ≥20.0%, preferably ≤15.0%, more preferably ≤10.0%, with regard to the total thickness of the multilayer film. Each of the sealing layer(s) may for example have a thickness of ≥5.0 and ≤20.0%, preferably ≥5.0 and ≤15.0%, more preferably ≥10.0 and ≤15.0%, with regard to the total thickness of the multilayer film.

The multilayer film according to the present invention may for example be a bi-directionally oriented film having a thickness of ≥2.0 and ≤200 µm, preferably between 3 and 100 µm, more preferably between 5 and 100 µm, more preferably between 5 and 50 µm.

The multilayer film may for example have a degree of orientation in the machine direction of at least 4.0. In the context of the present invention, orientation may also be referred to as stretch. Orientation in the machine direction is to be understood to be the ratio of the length in the machine direction of a certain quantity of material after having been subjected to a stretching force in the machine direction to the length that that very same quantity of material had prior to having been subjected to the stretching force in the machine direction.

The multilayer film may for example have an orientation in the transverse direction of at least 8.5. Orientation in the transverse direction is to be understood to be the ratio of the length in the transverse direction of a certain quantity of material after having been subjected to a stretching force in the transverse direction to the length that that very same quantity of material had prior to having been subjected to the stretching force in the transverse direction.

Stretching in the transverse direction may for example be achieved by clamping the film in clamps positioned on either side of the film at certain distance intervals, applying a certain heat to the film to ensure that the film is at a certain temperature, and applying an amount of force onto the clamps outwards from the plane of the film in the transverse direction. Such stretching may for example be done in a continuous operation.

The invention also relates to a process for production of the multilayer film according to the invention, wherein the process involves the step in this order of:
(a) manufacturing an unoriented film via cast extrusion, the unoriented film comprising:
   an inner layer system comprising a first surface and a second surface;
   a first skin layer bound to the inner layer system at the first surface of the inner layer system; and
   a second skin layer bound to the inner layer system at the second surface of the inner layer system;
   wherein
   the inner layer system comprises a first ethylene-based polymer; and
   at least one of the first or the second skin layer(s) is a sealing layer and comprises a second ethylene-based polymer having peak melting temperature $T_{pm}$ of at least 10° C. below the $T_{pm}$ of the first ethylene-based polymer, $T_{pm}$ being determined as peak melting temperature in accordance with ASTM D3418 (2008);

(b) subjecting the unoriented film to heat to bring the film to a temperature of >70° C. and <$T_{pm}$ of the second ethylene-based polymer;
(c) stretching the heated cast film by:
   applying a stretching force in the machine direction (MD) to induce a drawing in the machine direction, and subsequently subjecting the obtained film to heat to bring the film to a temperature of between $T_{pm}$−25° C. and $T_{pm}$ of the first ethylene-based polymer, under application of a stretching force in the transverse direction (TD) to induce a drawing in the transverse direction;
or
   simultaneously applying a stretching force in the MD and the TD to induce a drawing in the MD and the TD;
(d) maintaining the stretching forces and temperature to ensure drawing in TD is maintained to a level of >85% of the drawing in TD as applied; and
(e) releasing the stretch force and cooling the stretched films to obtain a bi-directionally oriented film.

The present invention also relates to a package comprising the multilayer film according to the invention. In particular, the invention relates to an embodiment wherein such package contains foodstuff products.

The invention also relates in one of its embodiments to the use of a second ethylene-based polymer, in a skin layer of a bi-directionally oriented film comprising an inner layer system comprising a first ethylene-based polymer, for reduction of the temperature at which a seal strength of 2.8 N/15 mm is achieved, the seal strength being determined in accordance with ASTM F88 (2015), method C, wherein the second ethylene-based polymer has a peak melting temperature $T_{pm}$ of at least 10° C., preferably of at least 15° C., below the $T_{pm}$ of the first ethylene-based polymer, $T_{pm}$ being determined as peak melting temperature in accordance with ASTM D3418 (2008).

The invention also relates in one of its embodiments to the use of a second ethylene-based polymer, in a skin layer of a bi-directionally oriented film comprising an inner layer system comprising a first ethylene-based polymer and two skin layers, for reduction of the temperature at which a seal strength of 2.8 N/15 mm is achieved, the seal strength being determined in accordance with ASTM F88 (2015), method C, wherein the second ethylene-based polymer has a peak melting temperature $T_{pm}$ of at least 10° C., preferably of at least 15° C., below the $T_{pm}$ of the first ethylene-based polymer, $T_{pm}$ being determined as peak melting temperature in accordance with ASTM D3418 (2008).

The invention will now be illustrated by the following non-limiting examples.

Polymer Materials

| Polymer | PE-1 | PE-2 | PE-3 | PE-4 | PE-5 |
|---|---|---|---|---|---|
| MFR2 | 0.86 | 2.14 | 1.00 | 3.50 | 5.00 |
| Density | 920 | 921 | 912 | 902 | 868 |
| $T_{pm}$ | 124 | 124 | 108 | 100 | 62 |
| Crystallisation temperature | 111 | 111 | 95 | 81 | 50 |
| Ethylene units content | 89.3 | 89.0 | 88.1 | 81.5 | 64.3 |
| Comonomer units content | 10.7 | 11.0 | 11.9 | 18.5 | 35.7 |
| Comonomer type | C6 | C6 | C8 | C8 | C8 |
| $M_n$ | 27 | 18 | 32 | 24 | 28 |
| $M_w$ | 145 | 115 | 95 | 70 | 83 |

-continued

|  |  |  |  |  |  |
|---|---|---|---|---|---|
| $M_z$ | 540 | 450 | 205 | 145 | 170 |
| $M_w/M_n$ | 5.5 | 6.3 | 3.0 | 2.9 | 2.9 |
| $M_z/M_w$ | 3.7 | 3.9 | 2.2 | 2.1 | 2.0 |
| $M_z/M_n$ | 20.4 | 25.4 | 6.4 | 6.0 | 6.1 |
| a-TREF <30 | 11.8 | 13.5 | 0.9 | 2.9 | 99.0 |
| a-TREF 30-94 | 49.8 | 50.9 | 99.1 | 97.1 | 1.0 |
| a-TREF >94 | 38.4 | 35.6 | 0 | 0 | 0 |
| CCDB |  |  |  | 8.6 | 18.6 |
| G' at G" = 5000 Pa |  |  |  |  | 783 |

Wherein:
 the MFR2 is the melt mass flow rate as determined in accordance with ASTM D1238 (2013) at a temperature of 190° C. under a load of 2.16 kg, expressed in g/10 min;
 the density is determined in accordance with ASTM D792 (2008), expressed in kg/m$^3$;
 the peak melting temperature $T_{pm}$ and the crystallisation temperature are determined using differential scanning calorimetry in accordance with ASTM D3418 (2018), expressed in ° C.;
 the ethylene units content indicates the weight quantity of units present in the polymer that are derived from ethylene, also referred to as the quantity of moieties derived from ethylene, with regard to the total weight of the polymer, expressed in wt %;
 the comonomer content indicates the weight quantity of units present in the polymer that are derived from the comonomer, also referred to as the quantity of moieties derived from the comonomer, with regard to the total weight of the polymer, expressed in wt %;
 the comonomer type indicates the type of comonomer used in the production of the polymer, where C6 is 1-hexene and C8 is 1-octene;
 $M_n$ is the number average molecular weight, $M_w$ is the weight average molecular weight, and $M_z$ is the z-average molecular weight, wherein $M_n$, $M_w$, and $M_z$ are each expressed in kg/mol, and determined in accordance with ASTM D6474 (2012);
 a-TREF <30 indicates the fraction of the polymer that is eluted in a-TREF according to the method presented above in the temperature range ≤30.0° C., expressed in wt %, and represents the amorphous fraction of the polymer, calculated by subtracting the a-TREF 30-94 and the a-TREF >94 fraction from 100.0 wt %;
 a-TREF 30-94 indicates the fraction of the polymer that is eluted in a-TREF in the temperature range of >30.0 and ≤94.0° C., expressed in wt %, and represents the branched fraction of the polymer;
 a-TREF >94 indicates the fraction of the polymer that is eluted in a-TREF in the temperature range of >94.0 and <140° C., expressed in wt %, and represents the linear fraction of the polymer; and
 the CCDB is the chemical composition distribution broadness calculated according to the method described herein above.

The comonomer content and the comonomer type were determined by $^{13}$C NMR on a Bruker Avance 500 spectrometer equipped with a cryogenically cooled probe head operating at 125° C., whereby the samples are dissolved at 130° C. in $C_2D_2Cl_4$ containing DBPC as stabiliser.

The a-TREF analyses were carried out using a Polymer Char Crystaf TREF 300 device using a solution containing 4 mg/ml of sample in 1,2-dichlorobenzene stabilised with 1 g/l Topanol CA (1,1,3-tri(3-tert-butyl-4-hydroxy-6methylphenyl)butane) and 1 g/l Irgafos 168 (tri(2,4-di-tert-butylophenyl)phosphite) at a temperature of 150° C. for 1 hour. The solution was further stabilised for 45 minutes at 95° C. under continuous stirring at 200 rpm before analyses. For analyses, the solution was crystallised from 95° C. to 30° C. using a cooling rate of 0.1° C./min. Elution was performed with a heating rate of 1° C./min from 30° C. to 140° C. The set-up was cleaned at 150° C.

Using the above polymers, three-layer biaxially oriented films were produced.

In examples 1-3, the biaxially oriented films were produced in a cast film production line with subsequent sequential biaxial orientation. A set-up comprising three melt extruders was used, where an extruder A supplied material for a first skin layer A, an extruder B supplied material for inner layer B, and an extruder C supplied the material for the second skin layer C. The extruders were positioned such that the molten material was forced through a t-shaped die with a die gap of 3.0 mm, so that the arrangement of the layers in the obtained cast film was A/B/C. Each of the extruders A, B and C was operated such to supply molten polymer material at a temperature of 260° C. The die temperature was 260° C.

The film as extruder through the t-shaped die was cast onto a chill roll to form a cast film having a thickness of about 840 µm.

The chilled cast film was subjected to stretching in the machine direction using a set of stretching rolls at a temperature of 98° C., followed by an annealing at 80° C., to induce a degree of stretching in the machine direction of 4.6.

Subsequently, the film was stretched in the transverse direction to a degree of stretching of 9.0 by subjecting the film to heat whilst applying a stretching force, wherein the film was passed through an oven through which the film was continuously transported, wherein the temperature was 140° C. at the entering zone of the oven, decreasing to 100° C. towards the exit of the oven. The skin layer C was subsequently subjected to a corona treatment of 25 W·min/m$^2$.

For each example, bi-directionally oriented 3-layer films having a thickness of 20 µm were obtained.

In examples 4-7, the biaxially oriented films were produced in a cast film production line with subsequent simultaneous biaxial orientation. Unoriented sheets of 90×90 mm, thickness 0.7 mm, were prepared using a twin-screw extruder having a length over diameter ratio of 42, at a temperature of the melt of 230° C., with a throughput of 16 kg/h. A KARO IV sheet stretching machine, obtainable from Brückner Maschinenbau, was used to stretch the sheets, in sequential operation. The drawing speed was 100%/s, and the drawing temperature 120° C. All test specimens were pre-heated for 40 s before stretching force was applied. The draw ratio was set to 5 in the machine direction and 9 in the transverse direction. After drawing, the samples were removed from the machine after cooling under tension. Bi-directionally oriented films having a thickness of 14 µm were obtained.

The composition of the experimental films is presented in the table below.

| Example | Layer | Material composition | Layer weight | Layer thickness |
|---|---|---|---|---|
| 1 (C) | A | 99.8% PE-1, 0.2% clay | 7.0 | 1.4 |
|  | B | 100% PE-1 | 86.0 | 17.2 |
|  | C | 99.8% PE-1, 0.2% clay | 7.0 | 1.4 |

-continued

| Example | Layer | Material composition | Layer weight | Layer thickness |
|---|---|---|---|---|
| 2 | A | 74.8% PE-1, 25% PE-4, 0.2% clay | 7.0 | 1.4 |
|   | B | 100% PE-1 | 86.0 | 17.2 |
|   | C | 99.8% PE-1, 0.2% clay | 7.0 | 1.4 |
| 3 | A | 74.8% PE-1, 25% PE-5, 0.2% clay | 7.0 | 1.4 |
|   | B | 100% PE-1 | 86.0 | 17.2 |
|   | C | 99.8% PE-1, 0.2% clay | 7.0 | 1.4 |
| 4 (C) | A | 97% PE-2, 3% AB | 15.0 | 2.1 |
|   | B | 98% PE-2, 2% SL | 70.0 | 9.8 |
|   | C | 97% PE-2, 3% AB | 15.0 | 2.1 |
| 5 | A | 62% PE-2, 35% PE-3, 3% AB | 15.0 | 2.1 |
|   | B | 98% PE-2, 2% SL | 70.0 | 9.8 |
|   | C | 97% PE-2, 3% AB | 15.0 | 2.1 |
| 6 | A | 97% PE-3, 3% AB | 15.0 | 2.1 |
|   | B | 98% PE-2, 2% SL | 70.0 | 9.8 |
|   | C | 97% PE-2, 3% AB | 15.0 | 2.1 |
| 7 | A | 62% PE-2, 35% PE-4, 3% AB | 15.0 | 2.1 |
|   | B | 98% PE-2, 2% SL | 70.0 | 9.8 |
|   | C | 97% PE-2, 3% AB | 15.0 | 2.1 |

Wherein the percentage in the material composition relates to the quantity of the particular material, in wt % with regard to the total weight of the material of that given layer, and wherein the layer weight indicates the percentage of the weight of the given layer with regard to the total weight of the given experimental film. The layer thickness is expressed in µm. In the above table, AB refers to anti-block agent AB06001LD, obtainable from Constab, and SL refers to slip agent SL05004LD, obtainable from Constab.

Of the thus obtained films, the heat seal strength was determined in accordance with ASTM F88, using method C, on specimens of 15 mm width. Fin-seals were prepared according ASTM F2029 at different temperatures. Two samples of film were compressed together, with layer A of the first film sample contacting layer A of the second film sample. Seals were produced by applying a force of 3.0 bar for 1.0 sec, wherein the films were protected with a 25 µm cellophane sheet. The press used for preparing the seal was heated to various temperatures to identify the strength of the seal when produced at different temperatures. By variation of the press temperature, the seal initiation temperature, which is the lowest temperature at which a seal having a strength of at least 2.8 N is obtained, was determined.

The seal strength was tested using a tensile testing machine with a testing speed of 200 mm/min, and a grip distance of 10 mm. The maximum load was recorded as the seal strength.

The results of seal strength testing of films of the various above examples, sealed at varying temperatures, are presented in the table below.

| Example | SIT | Seal strength | | | | | | |
|---|---|---|---|---|---|---|---|---|
| | | 60° C. | 70° C. | 80° C. | 90° C. | 100° C. | 110° C. | 120° C. |
| 1 | 120° C. | 0.51 | 1.19 | 2.26 | 2.46 | 1.49 | 2.44 | 2.85 |
| 2 | 94° C. | 0.51 | 0.29 | 0.30 | 0.71 | 6.38 | 8.90 | 14.00 |
| 3 | ≤60° C. | 3.40 | 6.36 | 4.91 | 5.70 | 7.00 | 8.90 | 12.50 |
| 4 | 116 | — | — | 0.15 | 0.14 | 0.24 | 0.45 | 8.50 |
| 5 | 107 | — | — | 0.13 | 0.29 | 0.57 | 5.90 | 10.50 |
| 6 | 83 | — | — | 0.17 | 6.68 | 10.20 | 9.40 | 10.30 |
| 7 | 95 | — | — | 0.20 | 0.44 | 4.66 | 7.60 | 10.00 |

From this table, it can be observed that films having a skin layer comprising an ethylene-based polymer having a peak melting temperature of at least 10° C. below that of the peak melting temperature of the ethylene-based polymer in the inner layer of the biaxially oriented film have a reduced seal initiation temperature, and thus can be used in packages wherein the seal can be produced at a lower temperature. This not only results in improved process economy, as such seals can be produced faster and using less energy, it also is beneficial for the retention of the product quality of the packed foodstuffs, as they are exposed to lower temperatures during the sealing of the package.

The invention claimed is:
1. A multilayer film comprising:
an inner layer system comprising a first surface and a second surface;
a first skin layer bound to the inner layer system at the first surface of the inner layer system; and
a second skin layer bound to the inner layer system at the second surface of the inner layer system;
wherein:
the inner layer system comprises a first ethylene-based polymer; and
at least one of the first or the second skin layer(s) is a sealing layer and comprises a second ethylene-based polymer having a peak melting temperature $T_{pm}$ of at least 10° C. below the $T_{pm}$ of the first ethylene-based polymer, $T_{pm}$ being determined as peak melting temperature in accordance with ASTM D3418 (2008);
the first ethylene-based polymer and the second ethylene-based polymer are copolymers comprising moieties derived from ethylene and moieties derived from one or more α-olefins selected from the group consisting of 1-butene, 4-methyl-1-pentene, 1-hexene, and 1.octene;
the first ethylene-based polymer has a fraction that is eluted in analytical temperature rising elution fractionation (a-TREF) at a temperature ≤30.0° C. of ≥8.0 wt %, with regard to the total weight of the polymer; and a fraction that is eluted in a-TREF at a temperature >94.0° C. of ≥20.0 wt %, with regard to the total weight of the first ethylene-based polymer;
the second ethylene-based polymer has a density of ≥850 and ≤914 kg/m$^3$ as determined in accordance with ASTM D792 (2008) and a fraction that is eluted in analytical temperature rising elution fractionation (a-TREF) at a temperature >94.0° C. of ≤5.0 wt % with regard to the total weight of the second ethylene-based polymer; and
the multilayer film is a bi-directionally oriented film wherein the orientation is introduced in the solid state.

2. The multilayer film according to claim 1, wherein the first skin layer comprises the second ethylene-based polymer and wherein the second skin layer comprises the first ethylene-based polymer.

3. The multilayer film according to claim 1, wherein the first ethylene-based polymer comprises at least 70.0 wt % of moieties derived from ethylene with regard to the total weight of the first ethylene-based polymer, wherein the first ethylene-based polymer has at least one of:
  a density of ≥910 and ≤930 kg/m$^3$ as determined in accordance with ASTM D792 (2008); or
  a melt mass-flow rate of ≥0.5 and ≤5.0 g/10 min, as determined in accordance with ASTM D1238 (2013) at a temperature of 190° C. under a load of 2.16 kg.

4. The multilayer film according to claim 1, wherein the inner layer system consists of multiple layers.

5. The multilayer film according to claim 1, wherein the inner layer system comprises at least one layer comprising ≥95.0 wt % of the first ethylene-based polymer with regard to the total weight of the inner layer system.

6. The multilayer film according to claim 1, wherein the inner layer system comprises ≥95.0 wt % of the first ethylene-based polymer with regard to the total weight of the inner layer system.

7. The multilayer film according to claim 1, wherein the second ethylene-based polymer has a chemical composition distribution broadness (CCDB) of ≥5.0, wherein the CCDB is determined according to formula I:

$$CCDB = \frac{T_{z+2} - T_{n-2}}{T_{n-2}} * 100 \qquad \text{formula I}$$

wherein
$T_{n-2}$ is the moment calculated according to the formula II:

$$T_{n-2} = \frac{\Sigma \frac{w(i)}{T(i)^2}}{\Sigma \frac{w(i)}{T(i)^3}} \qquad \text{formula II}$$

and
$T_{z+2}$ is the moment calculated according to the formula III:

$$T_{z+2} = \frac{\Sigma w(i) \cdot T(i)^4}{\Sigma w(i) \cdot T(i)^3} \qquad \text{formula III}$$

wherein
w(i) is the sampled weight fraction in wt % with regard to the total sample weight in a-TREF analysis of a sample (i) taken at temperature T(i), where T(i)>30° C., the area under the a-TREF curve being normalised to surface area=1 for T(i)>30° C.; and
T(i) is the temperature at which sample (i) is taken in a-TREF analysis, in ° C.

8. The multilayer film according to claim 1, wherein the second ethylene-based polymer has:
  a shear storage modulus G' determined at a shear loss modulus G''=5000 Pa of >700 Pa, G' and G'' being determined in accordance with ISO 6721-10 (2015) at 190° C.; and
  a chemical composition distribution broadness (CCDB) of ≥5.0.

9. The multilayer film according to claim 1, wherein each of the sealing layer(s) comprises ≥95 wt % of the second ethylene-based polymer and <5.0 wt % of additives, with regard to the total weight of the sealing layer(s).

10. The multilayer film according to claim 1, wherein each of the sealing layer(s) has a thickness of ≤3.0 μm.

11. The multilayer film according to claim 1, wherein the inner layer system comprises at least one layer consisting of ≥95.0 wt % of the first ethylene-based polymer and <5.0 wt % of additives, with regard to the total weight of the inner layer system.

12. The multilayer film according to claim 1, wherein the inner layer system consists of ≥95.0 wt % of the first ethylene-based polymer and <5.0 wt % of additives, with regard to the total weight of the inner layer system.

13. The multilayer film according to claim 1, wherein each of the sealing layer(s) consists of ≥95 wt % of the second ethylene-based polymer and <5.0 wt % of additives, with regard to the total weight of the sealing layer(s).

14. The multilayer film according to claim 1, wherein the second ethylene-based polymer comprises moieties derived from ethylene and moieties derived from 1-octene.

15. The multilayer film according to claim 1, wherein the second ethylene-based polymer has a peak melting temperature $T_{pm}$ of ≤110° C.

16. The multilayer film according to claim 1, wherein a seal initiation temperature of less than or equal to 107° C. provides a seal strength of at least 2.8 N determined in accordance with ASTM F88 (2015) using Method C, on specimens of 15 mm width.

17. A process for production of the multilayer film according claim 1, wherein the process involves the step in this order of:
  (a) manufacturing an unoriented film via cast extrusion, the unoriented film comprising:
    an inner layer system comprising a first surface and a second surface;
    a first skin layer bound to the inner layer system at the first surface of the inner layer system; and
    a second skin layer bound to the inner layer system at the second surface of the inner layer system;
  wherein
    the inner layer system comprises a first ethylene-based polymer; and
    at least one of the first or the second skin layer(s) is a sealing layer and comprises a second ethylene-based polymer having peak melting temperature $T_{pm}$ of at least 10° C. below the $T_{pm}$ of the first ethylene-based polymer, $T_{pm}$ being determined as peak melting temperature in accordance with ASTM D3418 (2008);
  (b) subjecting the unoriented film to heat to bring the film to a temperature of >70° C. and <$T_{pm}$ of the second ethylene-based polymer;
  (c) stretching the heated cast film by:
    applying a stretching force in the machine direction (MD) to induce a drawing in the machine direction, and subsequently subjecting the obtained film to heat to bring the film to a temperature of between $T_{pm}$−25° C. and $T_{pm}$ of the first ethylene-based polymer, under application of a stretching force in the transverse direction (TD) to induce a drawing in the transverse direction;

or
- simultaneously applying a stretching force in the MD and the TD to induce a drawing in the MD and the TD;
- (d) maintaining the stretching forces and temperature to ensure drawing in TD is maintained to a level of >85% of the drawing in TD as applied; and
- (e) releasing the stretch force and cooling the stretched films to obtain a bi-directionally oriented film.

18. A package comprising the multilayer film of claim 1.

19. The package according to claim 18 wherein the package contains foodstuff products.

* * * * *